(12) United States Patent
Seo et al.

(10) Patent No.: US 10,169,637 B2
(45) Date of Patent: Jan. 1, 2019

(54) ON-SCREEN OPTICAL FINGERPRINT CAPTURE FOR USER AUTHENTICATION

(71) Applicant: QUALCOMM Incorporated, San Diego, CA (US)

(72) Inventors: Hae-Jong Seo, San Jose, CA (US); John Wyrwas, Mountain View, CA (US)

(73) Assignee: Qualcomm Incorporated, San Diego, CA (US)

( * ) Notice: Subject to any disclaimer, the term of this patent is extended or adjusted under 35 U.S.C. 154(b) by 220 days.

(21) Appl. No.: 15/297,088

(22) Filed: Oct. 18, 2016

(65) Prior Publication Data

US 2017/0109564 A1   Apr. 20, 2017

Related U.S. Application Data

(63) Continuation-in-part of application No. 15/295,936, filed on Oct. 17, 2016.

(Continued)

(51) Int. Cl.
| | |
|---|---|
| G06K 9/00 | (2006.01) |
| G06K 9/46 | (2006.01) |
| G06K 9/66 | (2006.01) |

(52) U.S. Cl.
CPC ..... G06K 9/00087 (2013.01); G06K 9/00067 (2013.01); G06K 9/4642 (2013.01); G06K 9/66 (2013.01)

(58) Field of Classification Search
CPC .......... G06K 9/00067; G06K 9/00087; G06K 9/4642; G06K 9/66
See application file for complete search history.

(56) References Cited

U.S. PATENT DOCUMENTS

| | | |
|---|---|---|
| 6,901,165 B1 | 5/2005 | Egger et al. |
| 2005/0129291 A1 | 6/2005 | Boshra |

(Continued)

FOREIGN PATENT DOCUMENTS

| | | |
|---|---|---|
| EP | 1835443 A1 | 9/2007 |
| KR | 20090073470 A | 7/2009 |

(Continued)

OTHER PUBLICATIONS

International Search Report and Written Opinion—PCT/US2016/057605—ISA/EPO—dated Feb. 1, 2017.

*Primary Examiner* — Phuoc Tran
(74) *Attorney, Agent, or Firm* — Kilpatrick Townsend & Stockton, LLP

(57) ABSTRACT

Example methods, systems, computer-readable media, and apparatuses for on-screen optical fingerprint capture for user authentication are presented. These allow for the authentication of a fingerprint where the fingerprint image is propagated in a glass layer before being captured by a camera. In some examples, such propagation can result in multiple fingerprint images resulting from total internal reflection within the glass layer. Feature information can then be determined from the captured image of the fingerprint, which can include multiple fingerprint images. The amount of feature information can then be reduced. A histogram associated with the captured image based on the reduced number of features can be generated, and a user can be authenticated based on the histogram.

30 Claims, 10 Drawing Sheets

Related U.S. Application Data

(60) Provisional application No. 62/243,517, filed on Oct. 19, 2015, provisional application No. 62/243,618, filed on Oct. 19, 2015.

(56) References Cited

U.S. PATENT DOCUMENTS

| | | |
|---|---|---|
| 2007/0217660 A1* | 9/2007 | Komura ............ G06K 9/00885 |
| | | 382/115 |
| 2008/0253625 A1 | 10/2008 | Schuckers et al. |
| 2009/0128499 A1 | 5/2009 | Izadi et al. |
| 2009/0285459 A1 | 11/2009 | Aggarwal et al. |
| 2013/0092838 A1 | 4/2013 | Weber et al. |
| 2014/0028629 A1 | 1/2014 | Drumm et al. |
| 2014/0098306 A1 | 4/2014 | King et al. |
| 2014/0192023 A1 | 7/2014 | Hoffman |
| 2015/0253931 A1 | 9/2015 | Wyrwas et al. |
| 2015/0317034 A1 | 11/2015 | Kent et al. |
| 2015/0331545 A1 | 11/2015 | Wassvik et al. |
| 2015/0331546 A1 | 11/2015 | Craven-Bartle et al. |
| 2015/0347804 A1* | 12/2015 | Feng ................... G06K 9/001 |
| | | 382/124 |
| 2016/0116664 A1 | 4/2016 | Wheatley et al. |
| 2016/0283772 A1* | 9/2016 | Nelson ................. G06F 3/0421 |
| 2017/0079591 A1 | 3/2017 | Gruhlke et al. |
| 2017/0109561 A1 | 4/2017 | Wyrwas et al. |

FOREIGN PATENT DOCUMENTS

| | | |
|---|---|---|
| WO | 2015005959 A1 | 1/2015 |
| WO | 2015140600 A1 | 9/2015 |

\* cited by examiner

ON-SCREEN OPTICAL FINGERPRINT CAPTURE FOR USER AUTHENTICATION

CROSS-REFERENCE TO RELATED APPLICATIONS

This application claims priority as a continuation-in-part to U.S. patent application Ser. No. 15/295,936, filed Oct. 17, 2016, entitled "Cover-Glass Optical Isolation for Optical Touch and Fingerprint Sensing," and also claims the benefit of U.S. Provisional Application No. 62/243,618, filed Oct. 19, 2015, entitled "On-Screen Optical Fingerprint Capture for User Authentication," and U.S. Provisional Application No. 62/243,517, filed Oct. 19, 2015, entitled "Cover-Glass Optical Isolation for Optical Touch and Fingerprint Sensing," the entirety of all of which are incorporated herein by reference in their entirety.

BACKGROUND

Fingerprints and other types of biometric authentication are considered more secure than PIN-based passwords and can eliminate issues such as password theft. Furthermore, biometrics can be more convenient and faster than typing passwords. However, there are some issues with existing fingerprint sensors. For example, the sensor component and its sensing area take up "real estate" on the front face of the mobile device. This limits how much of the front face of the device the display can occupy, and thus limits the overall display and phone dimensions. This can lead to tradeoffs between display size and fingerprint sensor size, but a smaller sensing area may cause user authentication to be less accurate, and lead to more erroneous authentication failures. Additionally, the user experience is interrupted by the authentication process when the user is interacting with applications. For example, to confirm a payment or log into an account, the device must prompt the user to move his or her finger off the touch-screen of the display, touch the fingerprint reader, and then resume the previous task.

BRIEF SUMMARY

Various examples are described for on-screen optical fingerprint capture for user authentication. One disclosed method comprises receiving an image of a fingerprint captured by a camera, the image of the fingerprint being based on light reflected from a fingertip and propagated within a glass layer of a display assembly; determining feature information from the captured image of the fingerprint; reducing the amount of feature information; generating a histogram associated with the captured image based on the reduced amount of feature information; and authenticating a user based on the histogram.

An example computing device comprises a non-transitory computer-readable medium; a processor in communication with the non-transitory computer-readable medium; and a display assembly in communication with the processor, the display assembly comprising a glass layer; and a camera comprising an image sensor, the image sensor oriented to receive light propagated within the glass layer of the display assembly; and wherein the processor is configured to: receive an image of a fingerprint from the camera, the image based on the propagated light within the glass layer; determine feature information from the captured image of the fingerprint; reduce the amount of feature information; generate a histogram associated with the captured image based on the reduced amount of feature information; and authenticate a user based on the histogram.

An example apparatus comprises means for propagating light within a display assembly; means for capturing an image based on light received from the means for propagating light within a display assembly; means for directing the propagating light onto the means for capturing an image; means for determining feature information from the captured image of the fingerprint; means for reducing the amount of feature information; means for generating a histogram associated with the captured image based on the reduced number of features; and means for authenticating a user based on the histogram.

An example non-transitory computer-readable medium comprising processor-executable instructions configured to cause a processor to: receive an image of a fingerprint based on light reflected from a fingertip; determine feature information from the captured image of the fingerprint; reduce the amount of feature information; generate a histogram associated with the captured image based on the reduced amount of feature information; and authenticate a user based on the histogram.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of on-screen optical fingerprint capture for user authentication. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Figure 1:
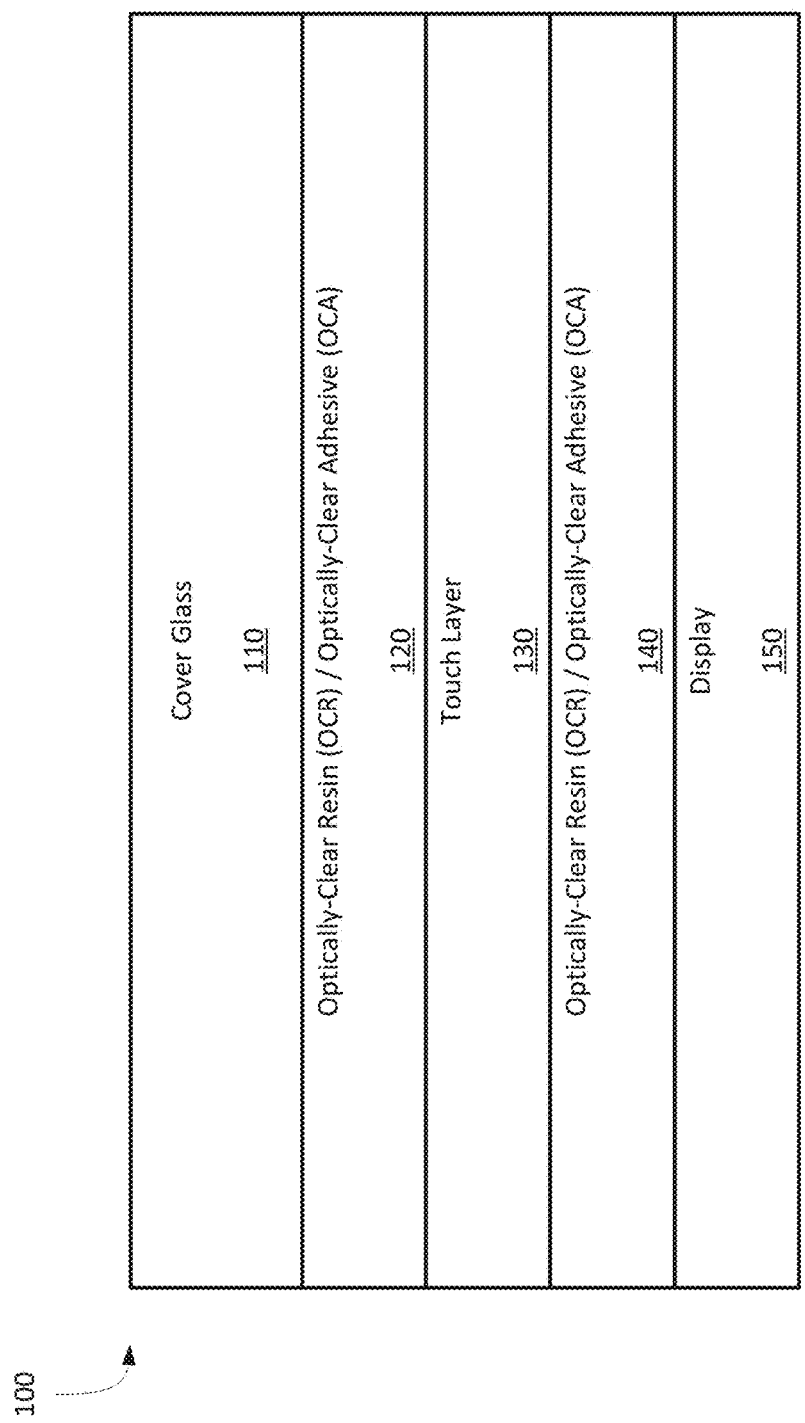
FIG. 1 shows a traditional touch-sensitive display assembly for a computing device.

Illustrative Example of on-Screen Optical Fingerprint Capture for User Authentication Referring now to FIG. 1, FIG. 1 shows a traditional touch-sensitive display assembly 100 for a computing device. The display assembly 100 includes several layers that are coupled to each other by resins or adhesives. The layers in this example are a cover glass layer 110, which is exposed to the user to allow the user to use touch to interact with the associated computing device. The cover glass layer 110 is bonded to a touch layer 130, such as capacitive touch sensor or other means for touch input, using an optically-clear resin (OCR) or optically-clear adhesive (OCA) layer 120. The touch layer 130 is in turn bonded to a display layer 150 by another OCR or OCA layer 140, which may be the same or different OCR or OCA as layer 120. The various layers above the display layer 150 are substantially transparent to enable light emitted by the display to be viewed by the user of the computing device. It should be noted that the layers of FIG. 1 are not shown to scale.

Figure 2:
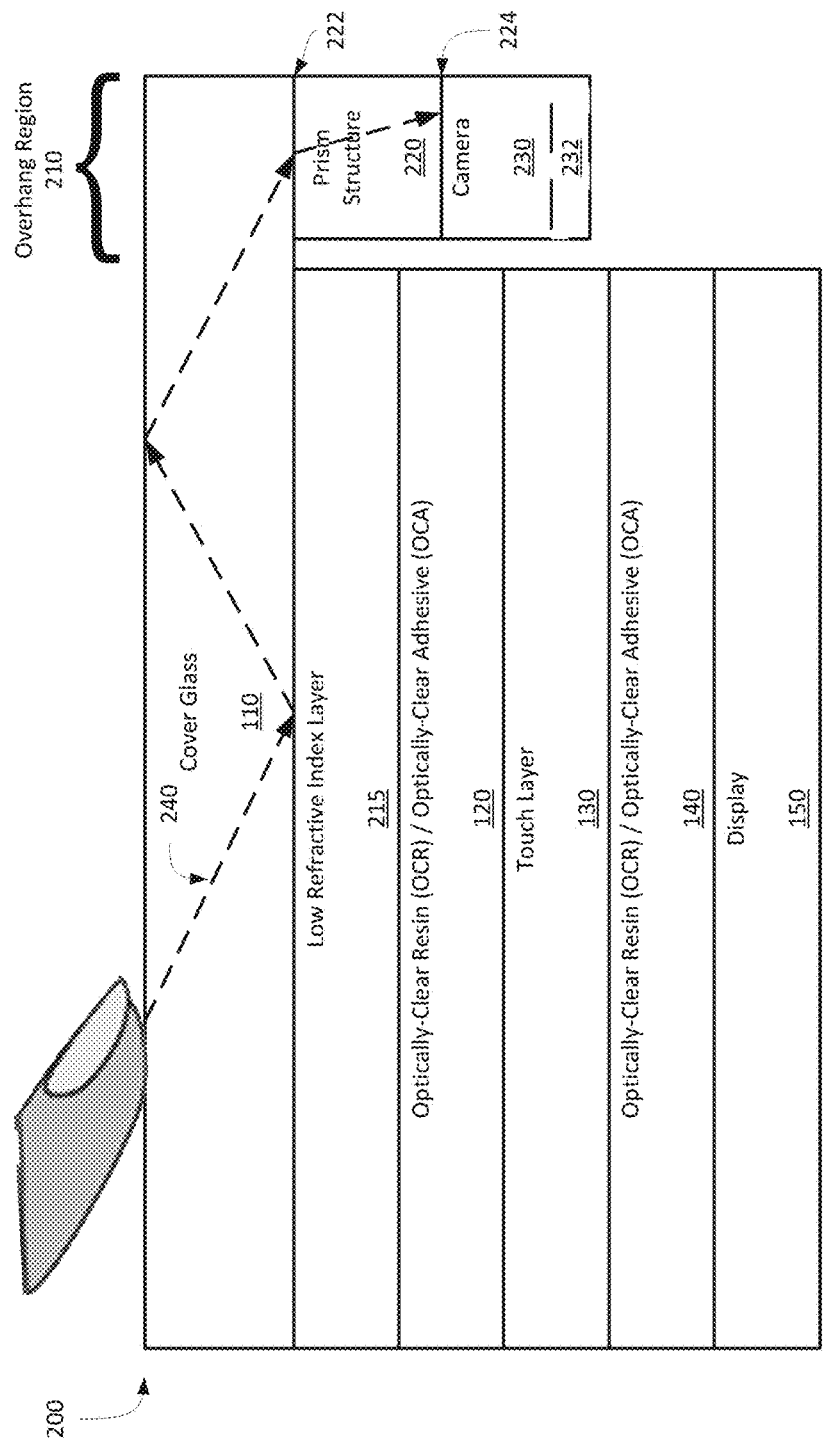
FIGS. 2-3 show example display assemblies for cover-glass optical isolation for optical touch and fingerprint sensing according to the present disclosure.

Referring now to FIG. 2, FIG. 2 shows an example display assembly 200 for on-screen optical fingerprint capture for user authentication according to the present disclosure. In the example shown in FIG. 2, the display assembly 200 includes a display layer 150 coupled to a lower surface of a touch layer 130 by an OCR or OCA layer 140. In this example, the upper surface of the touch layer 130 is coupled to a low refractive index (LRI) layer 215 by another OCR or OCA layer 120. The LRI layer 215 is in turn applied to a lower surface of the cover glass 110. As may be seen, however, the cover glass 110 has a length or width dimension that is greater than a corresponding length or width dimension of the LRI layer 215, and one or more of the other layers 120-150, which creates an overhang region 210.

In this example, an upper surface of a prism structure 220, or other means for directing light from the cover glass layer 110 onto the camera 230, is coupled to the lower surface of the cover glass 110 within the overhang region 210. Another surface of the prism structure 220 is coupled to a camera 230 such that a sensor of the camera 230 is oriented in a plane substantially parallel to a second surface 224 of the prism structure 220. In some examples, however, the sensor of the camera 230 may be oriented in a plane that is not parallel to the second surface 224 of the prism structure 220, or a lens of the camera 230 may not be oriented along an axis parallel to the image sensor, to make use of the Scheimpflug effect. For example, the camera 230 may be tilted with respect to the second surface 224 of the prism structure 220 at an angle of approximately 5 degrees from parallel. In some examples, the camera 230 may be tilted at an angle of up to 20 degrees from a plane parallel to the second surface 224 of the prism structure 220.

In the example display assembly 200 of FIG. 2, the coupling of the LRI layer 215 with the cover glass 110 may change the optical properties of the boundary between the cover glass 110 and the OCR/OCA layer 120 to cause certain light rays to reflect from the cover glass/LRI layer boundary and to propagate within the cover glass 110 via internal reflection within the cover glass 110. By selecting an LRI layer 215 with a refractive index lower than the refractive index of the cover glass 110, some of the light rays that would ordinarily propagate across the boundary between the cover glass 110 and the adjoining OCR/OCA layer 120 of the display assembly 100 in FIG. 1 instead reflect internally within the cover glass 110. For example, if a user touches the cover glass 110 with a fingertip, a light ray 240, e.g., emitted by the display or a backlight or from an ambient light source, may reflect from the fingertip and propagate towards the LRI layer 215. Upon reaching the cover glass/LRI layer boundary, the light ray 240 reflects internally within the cover glass 110 due to the angle of incidence with the cover glass/LRI layer boundary. The light ray 240 then propagates within the cover glass 110 due to total internal reflection at the upper and lower boundary surfaces of the cover glass 110.

In the example display assembly 200 of FIG. 2, the LRI layer 215 has an LRI material having a refractive index lower than the refractive index of the cover glass 110. For example, a suitable difference between the refractive index of the LRI layer 215 and the cover glass 110, referred to as a "refractive delta" may be 0.09 or greater. In one example, if the cover glass 110 has a refractive index of approximately 1.5, a suitable LRI material may have a refractive index of 1.41 or less. However, in some examples, an LRI material may be selected to provide refractive delta of 0.09, 0.10, 0.14, 0.15, 0.17, or 0.18. In examples where the cover glass 110 has a refractive index of approximately 1.50 or 1.51, suitable LRI materials may have a refractive index between approximately 1.30 and 1.41. For example, a silicone coating having a refractive index of approximately 1.41 that is applied to the cover glass 110 may be a suitable LRI material and function as a suitable LRI layer. In some examples, suitable LRI materials may have a refractive index of approximately one or more of the following: 1.30, 1.31, 1.32, 1.33, 1.34, 1.35, 1.36, 1.37, 1.38, 1.39, 1.40, or 1.41. In some examples, suitable LRI materials may have a refractive index less than 1.30.

In some examples, other suitable materials may be used, such as one or more of Teflon fluoropolymer such as fluorinated ethylene propylene, or a siloxane polymer. Additional polymers suitable for an LRI layer 215 in example assemblies according to this disclosure include one or more of poly-tert-butyl methacrylate-co-glycidyl methacrylate, poly-difluoro-bistrifluoromethyl-dioxole-co-tetrafluoroethylene, poly-heptafluorobutyl acrylate, poly-heptafluorobutyl methacrylate, poly-heptafluorobutyl methacrylate-co-glycidyl methacrylate, poly-hexafluorobutyl acrylate, poly-hexafluorobutyl methacrylate, poly-hexafluorobutyl methacrylate-co-glycidyl methacrylate, poly-hexafluoroisopropyl acrylate, poly-hexafluoroisopropyl methacrylate, poly-hexafluoroisopropyl methacrylate-co-glycidyl methacrylate, poly-pentafluoropropyl acrylate), poly-pentafluoropropyl methacrylate, poly-pentafluoropropyl methacrylate-co-glycidyl methacrylate, poly-pentafluorostyrene, poly-pentafluorostyrene-co-glycidyl methacrylate, poly-tetrafluoropropyl acrylate, poly-tetrafluoropropyl methacrylate, poly-tetrafluoropropyl methacrylate-co-glycidyl methacrylate, poly-trifluoroethyl acrylate, poly-trifluoroethyl methacrylate, poly-trifluoroethyl methacrylate-co-glycidyl methacrylate.

Some monomers suitable for an LRI layer 215 in example assemblies according to this disclosure include one or more of heptafluorobutyl acrylate, heptafluorobutyl methacrylate, hexafluorobutyl acrylate, hexafluorobutyl methacrylate, hexafluoroisopropyl acrylate, hexafluoroisopropyl methacrylate, methyl methacrylate, pentafluoropropyl acrylate, pentafluoropropyl methacrylate, tetrafluoropropyl methacrylate, trifluoroethyl acrylate, and/or trifluoroethyl methacrylate.

In the example shown in FIG. 2, the LRI layer 215 has a thickness of less than 10 microns. However, in some examples, a suitable LRI layer 215 may be thicker. For example, a suitable LRI layer 215 may has a thickness of approximately 85 to 115 microns. In other examples, a suitable LRI layer 215 may have a thickness of 10 to 85 microns or greater than 115 microns. In further examples, and with reference to FIG. 4, a suitable LRI layer 215 may have a thickness based on a thickness of a substantially opaque mask applied to the cover glass. For example an LRI layer 215 may have a thickness that is substantially the same thickness as a cover glass mask, which may provide a substantially uniform planar mating between the LRI layer 215 and the cover glass 110 where such materials do not overlap.

These and other LRI layer means may be employed in different examples according to this disclosure.

As it propagates, the light ray 240 may ultimately strike the cover glass/prism boundary 222. Due to a difference in refractive indices in the materials of the cover glass 110 and the prism structure 220, the angle of incidence between the light ray 240 and the cover glass/prism boundary 222 may be sufficient to allow the light ray 240 to propagate across the cover glass/prism boundary 222, through the prism structure 220 and into the camera 230, where it strikes the camera's sensor. Thus, by capturing a number of such light rays, the camera 230 may be able to capture an image of a user's fingertip, and thereby the user's fingerprint, while it is in contact with the cover glass 110. Because the camera 230 is offset from the display 250, a separate dedicated surface region for capturing an image of the user's fingerprint is not needed. After capturing the image, the camera 230 may provide the captured image to a computing device to authenticate the user based on the image of the fingerprint. Such a display assembly may allow a device to unobtrusively authenticate a user that is interacting with a device. In certain examples, a display assembly means may include layers 110-150 and 215 as described above or may comprise, in addition, the prism structure 220 and camera 230 as described above. However, in other examples, a display assembly means may not include a touch layer or other means for touch input. In some examples, the display assembly means may include a means for propagating light that includes a cover glass layer 110 and a LRI layer 215.

In this example, the prism structure 220 comprises a material having a refractive index approximately equal to the refractive index of the cover glass 110. A suitable material may comprise a refractive index having a refractive index within a range of about 0.02 greater or less than the refractive index of the cover glass 110. Thus, the prism structure may allow light to propagate into the prism structure 220 with only a small change in angle. In this example, the prism structure 220 comprises a trapezoidal cross section with the upper and lower surfaces of the prism structure are substantially parallel, and a third side of the prism structure 220 having an interior angle of intersection of the approximately 55 degrees with the lower surface of the prism structure. An example of such a prism structure 220 is shown in FIG. 2. The third side of the prism structure 220 is configured with a mirror, e.g., metallized, finish applied to the optically-smooth third side of the prism structure 220. Thus light propagating into the prism structure 220 from the cover glass 110 may strike the mirrored third side of the prism structure and be reflected towards a sensor within the camera 230. In some examples, the interior angle of intersection of the third side and lower surface of the prism structure 220 may be different from 55 degrees based on the desired angle of total-internal reflection of the cover glass based on the LRI layer 215 or design constraints related to sizing of a device having the display assembly 200.

In some examples, the prism structure 220 may comprise a material having a refractive index substantially higher than the cover glass 110. For example, the prism structure 220 may comprise a material such as titanium dioxide or gadolinium gallium garnet (GGG). Such a prism structure 220 may be capable of redirecting light rays from the cover glass 110 onto a camera's sensor either without a mirror finish applied to one of the prism surfaces, or using a different interior angle of intersection of one of the sides of the prism structure 220 and a lower surface of the prism structure 220 based on the difference in refractive index between the cover glass 110 and the prism structure 220. In some examples, such a prism structure 220 may comprise a triangular cross section, such as a cross section having a right triangle.

The camera 230 comprises an image sensor 232, such as a CMOS image sensor, a charge-coupled device (CCD), a hybrid CMOS/CCD sensor, a micro-bolometer array, a Silicon-Germanium array, an avalanche photo detector array, a III-V or II-VI semiconductor array, etc. Certain examples may comprise cameras configured to capture infrared wavelengths, which may enable detection of biological processes, such as heartbeats, spectral information of the skin, or pulse oxidation information, which may indicate that a live fingertip is applied to the cover glass, rather than a copy of a fingerprint, such as printed on a sheet of paper or on a simulated finger, e.g., of a mannequin), which may further enhance user authentication by ensuring the user herself is touching the cover glass. In some examples, the camera 230 may also comprise one or more lenses designed to direct and focus light rays reflected by the third side of the prism structure 220 onto an image sensor 232 within the camera 230.

It should be appreciated that while the example discussed above with respect to FIG. 2 includes one prism structure and one camera, in some examples, a display assembly may include one or more prism structures or cameras.

Figure 3:
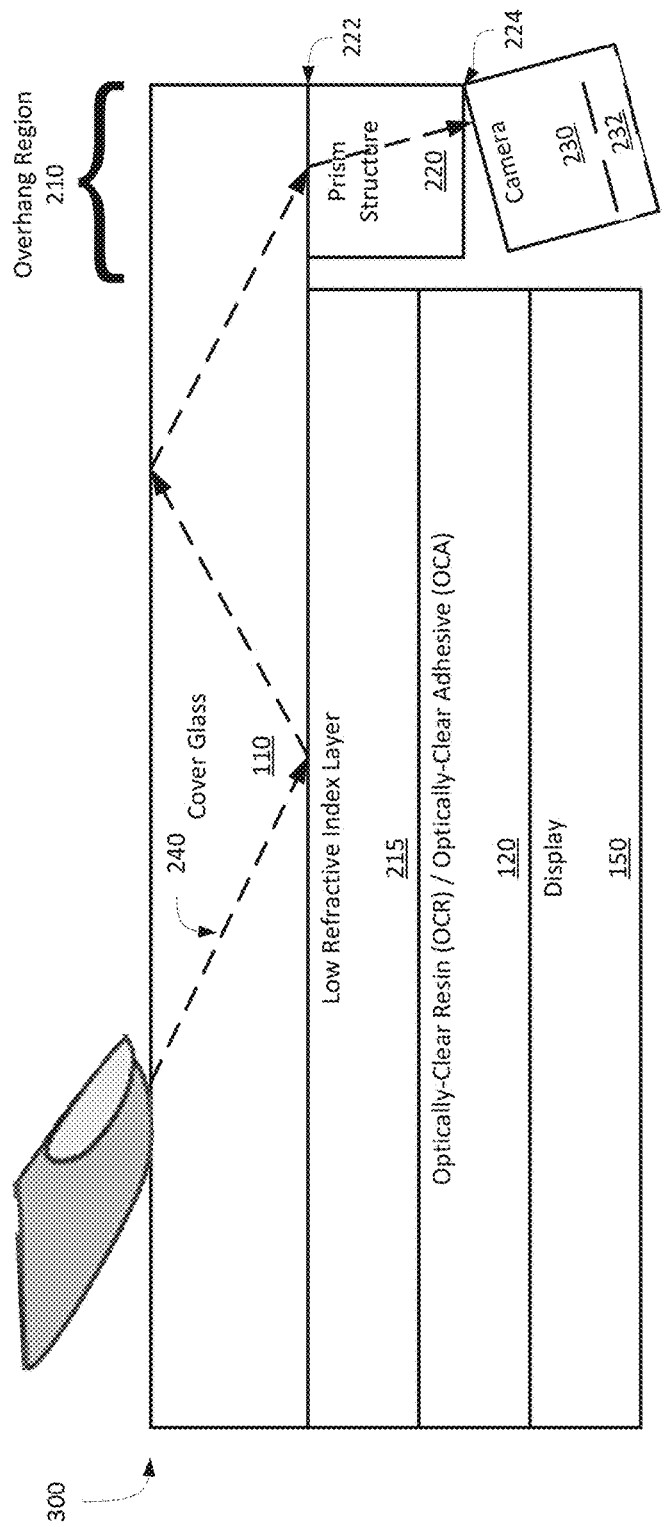

Referring now to FIG. 3, FIG. 3 shows another example display assembly 300 for on-screen optical fingerprint capture for user authentication according to the present disclosure. In this example, the display assembly 300 includes a cover glass layer 110, an LRI layer 215, and a display layer 150. The cover glass 110 is bonded to the LRI layer 215, which in turn is bonded to the display layer 150, such as by using a tape or by lamination or by dip coating or spin-on coating. In this example, the display assembly 300 lacks the touch layer 130 and OCR or OCA layer 140. In some examples, such as shown in FIG. 3, the display layer 150 may be directly coupled to the LRI layer 215 by an OCR or OCA layer 120; however, in some examples, the display layer may be indirectly coupled to the LRI layer 215 by one or more intermediate layers. For example, as may be seen in the example display assembly 200 shown in FIG. 2, the display layer 150 is indirectly coupled to the LRI layer via an intermediate coupling to the touch layer 130 by an OCR or OCA layer 140.

In this example, as discussed above with respect to FIG. 2, the camera 230 is positioned such that its image sensor 232 is oriented to receive light propagating through the prism structure 220 from the cover glass 110. However, in this example, rather than being oriented such that the image sensor 232 is in a plane parallel to the second surface 224 of the prism structure 220, the camera 230 and image sensor 232 are angled with respect to the second surface 224 of the prism structure. In this example, they are angled at approximately 5 degrees from parallel with the second surface 224 of the prism structure 220; however, as discussed above with respect to FIG. 2, the image sensor 232 may be angled at up to 20 degrees from parallel with the second surface 224 of the prism structure 220. The example display assembly 300 of FIG. 3 may provide for a display that can authenticate a person, but not accept touch-based input.

Figure 4:
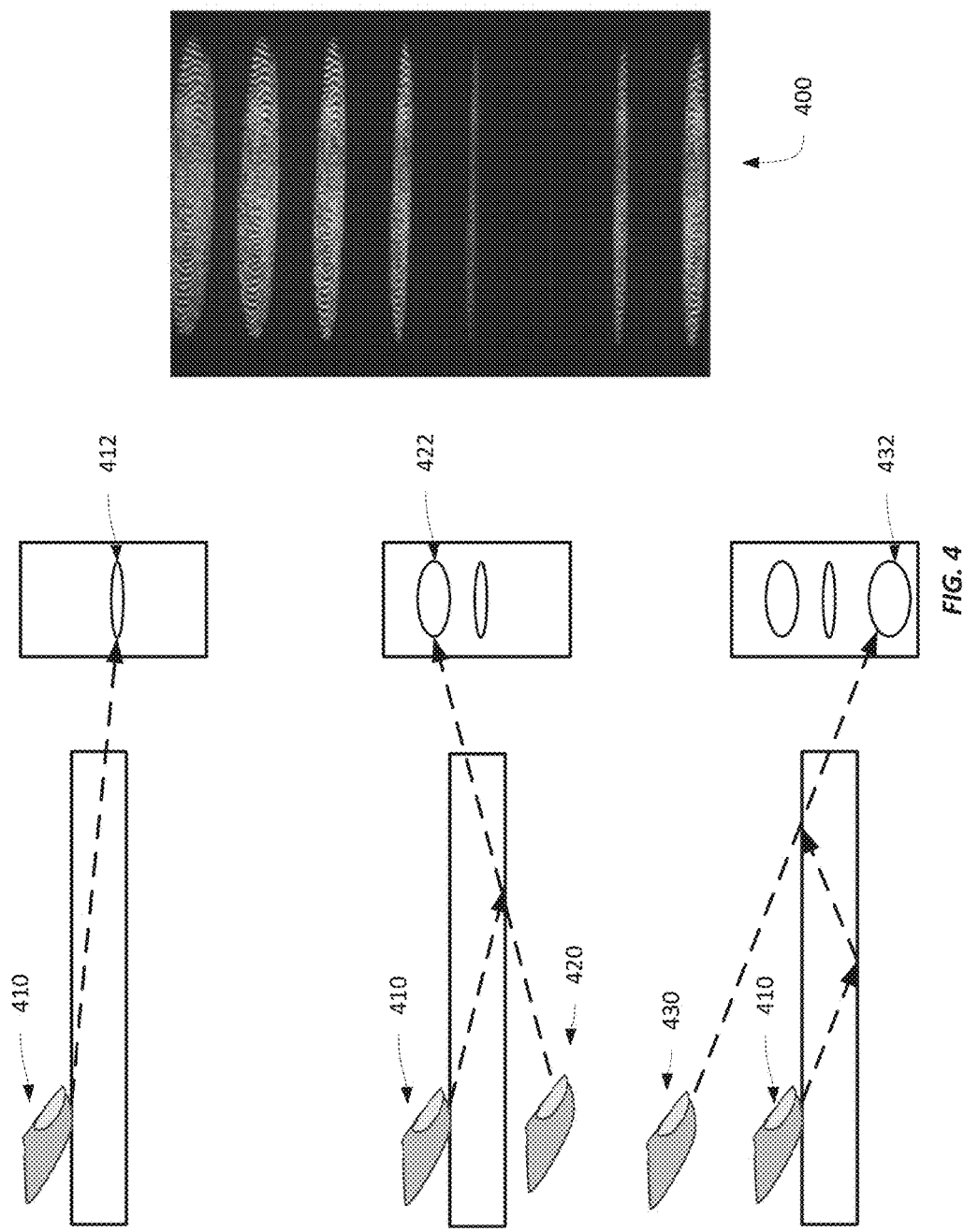
FIG. 4 shows an example captured image of a fingertip using an example display assembly for cover-glass optical isolation for optical touch and fingerprint sensing according to the present disclosure.

Referring now to FIG. 4, when the camera 230 captures an image of the user's fingertip 410 based on the light propagated through the cover glass 110, the image may comprise a plurality of stacked images of the fingertip 410, each having a different perspective of the fingertip 410. An example of such an image 400 is shown in FIG. 4. The stacking of the fingertips results from apparent "virtual" fingertips that result from internal reflections of various propagating light rays within the cover glass 110. Three examples of these propagating light rays are shown to illustrate this phenomenon.

Light that reflects from the user's fingertip 410 and travels without reflecting within the cover glass 110 to land on the camera's sensor generates a corresponding image of the fingerprint 412 that appears to lie in a flat plane that is nearly orthogonal to the plane of the captured image. The resulting image provides little information about the fingertip 410.

Light that reflects once within the cover glass 110 can also reach the camera's sensor and generate a corresponding image. In FIG. 4, captured image 422 illustrates that the image provides a perspective view of the finger print, with the perspective based on the angle of reflection within the cover glass 110. As the angle of reflection approaches 90 degrees, or orthogonal to the interior surface of the cover glass 110, the closer the perspective corresponds to an image of the fingerprint taken in a plane parallel to the plane of the camera's sensor. This limit condition corresponds to a camera positioned directly below the fingertip 410. While such a limit condition may not be possible without positioning the camera below the fingertip 410, varying angles of reflection will generate images of the fingertip 410 with a larger perspective angle, and thus a better view of the entirety of the fingertip 410. This reflection thus appears to be a captured image of a "virtual" fingertip floating in space away from the surface of the cover glass 110, examples of such virtual fingertips 420 and 430 are shown in FIG. 4. Thus, based on the angle of internal reflections and the size of the image sensor, an image 400 of an apparent "stack" of fingertip images may be captured. After the image 400 of the fingertip 410 has been captured, it may be possible to authenticate a user based on the captured image.

Figure 5:
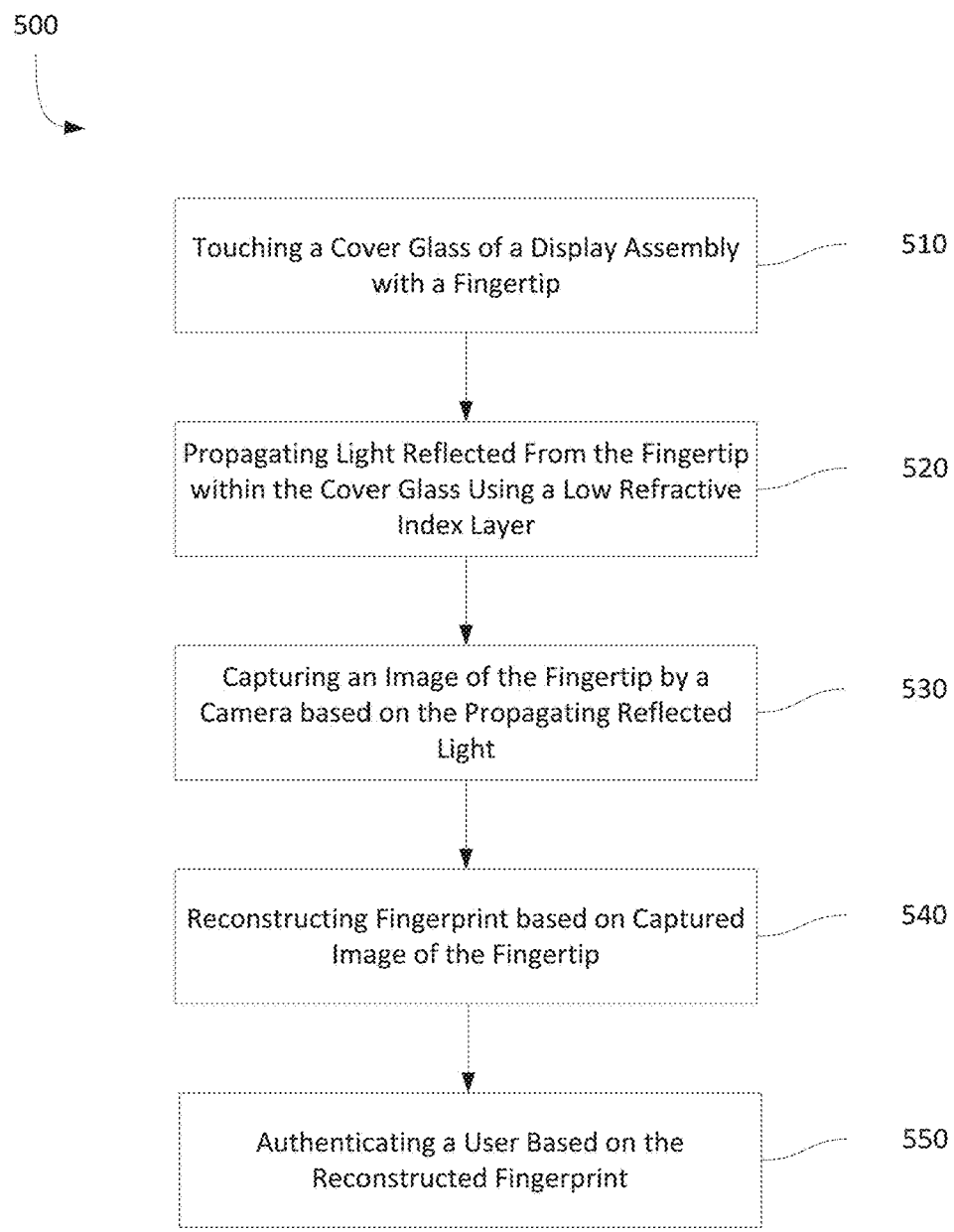
FIGS. 5, 7, and 10 show example methods of authenticating a user using an example display assembly according to this disclosure.

Referring now to FIG. 5, FIG. 5 shows an example method 500 of authenticating a user using an example display assembly according to this disclosure. The method 500 of FIG. 5 will be discussed with respect to the computing device 800 shown in FIG. 8 and the display assembly 200 of FIG. 2; however, it should be appreciated that other example display assemblies or computing devices according to this disclosure may be used to perform this and other example methods. The method 500 of FIG. 5 begins at block 510.

At block 510, a user touches the cover glass 110 of a display assembly 200 with one or more fingertips. For example, the user may touch the cover glass 110 of a display assembly 200 of the computing device 800, e.g., her smartphone.

At block 520, light reflects from the user's fingertip back into the cover glass 110 and propagates within the cover glass 110 by reflecting from inner surfaces of the cover glass 110 using the LRI layer 215, which allows a greater amount of reflected light to propagate within the cover glass 110.

At block 530, the camera 230 captures an image of the user's fingertip based on light propagating through the cover glass 110 into the prism structure 220 and onto the camera's sensor. It is noted that, as shown in FIG. 4, the "image" of the user's fingertip may actually include an apparent "stack" of fingertip images, each fingertip image in the stack of fingertip images having a different perspective of the fingertip. As such, the images captured by the camera 230 may include two or more fingertip images, each fingertip image having a different perspective of the fingertip as described above. It is understood that these two or more fingertip images are not fingertip images captured at different times, but rather represent multiple fingertip images captured simultaneously and that the multiple fingertip images arise from total internal reflection within the cover glass 110. Hence, subsequent computer vision and machine learning steps can be performed on the captured image which includes the two or more fingertip images. Furthermore, it is understood that method 500 includes blocks 510 and 520 for completeness, and that blocks 510 and 520 are not performed by the camera 230 or by a computing device 800 in communication with the camera 230. It is understood that, subsequent to block 530, computing device 800 will receive the image of the fingerprint captured by the camera 230.

At block 540, the computing device 800 reconstructs a fingerprint based on the captured image of the fingertip. As mentioned above, the captured image of the fingertip can include two or more fingertip images.

In one example, the computing device 800 analyzes the captured image based on a characterization of the imaging system as a linear system. In this example, the computing device treats the captured image as the output of a mapping of points onto the pixels of the image sensor:

$$A\vec{x} = \vec{y}$$

In this example, the vector x represents locations on the cover glass 110 while the vector y represents pixels on the image sensor. The mapping, A, represents a characterization of the imaging system as a linear system. Thus, A maps light that originates at some point in space, e.g., a point on the cover glass 110, to a pixel (or pixels) on the image sensor that the light ray would strike. Because the computing device 800 has captured an image, the value of y is known. Further, the mapping, A, can be modeled or experimentally determined for a given imaging system, which may further be usable on other imaging systems with similar characteristics without significant loss in precision. Thus, the equation must be solved for x to generate a reconstructed image of the fingertip based on its position on the cover glass 110.

In one example, the computing device 800 solves for x using a least-squares solution to solve the linear equation. Specifically, the computing device 800 is configured to solve the least-squares estimate according to the following expression:

$$\vec{x} = (A^T A)^{-1} A^T \vec{y}$$

The output vector, x, comprises coordinates representing the reconstructed fingertip, and thus provides an image representing the fingertip projected onto a plane corresponding to the plane of the image sensor.

In another example, the computing device 800 reconstructs the fingertip using a back-projection technique instead of the least-squares technique. The back-projection technique also employs the same initial relationship between the mapping of locations on the cover glass 110 to one or more pixels on the image sensor:

$$A\vec{x}=\vec{y}$$

However, the back-projection technique employs the following expression to generate the reconstruction:

$$\vec{x}=\hat{A}^T\vec{y}$$

In this expression, $\hat{A}^T$ represents the transpose of the Hadamard inverse, or the element-wise inverse, of A. Using the back-projection technique may be a less computationally-intensive operation for the computing device 800 than the least-squares technique. However, like the least-squares technique, the back-projection technique also outputs vector, x, which comprises coordinates representing the reconstructed fingertip, and thus provides an image representing the fingertip projected onto a plane corresponding to the plane of the image sensor.

In further examples, the computing device 800 may employ other techniques to reconstruct the fingertip from the captured image, such as algebraic reconstruction techniques or regularized stochastic reconstruction.

At block 550, the computing device 800 authenticates the user based on the reconstructed fingerprint. In this example, the computing device 800 extracts features or minutiae from the reconstructed fingerprint and recognizes the fingerprint using a fingerprint recognition technique. For example, the computing device may analyze the reconstructed image of the fingertip to extract one or more fingerprint patterns (e.g., arches, loops, whorls, etc.) or minutiae features (e.g., ridge endings, ridge bifurcations, short ridges, etc.), and compare the extracted data with information, such as fingerprint patterns or minutiae features, corresponding to one or more fingerprints in a database to identify a match (or a match failure) to authenticate a user.

Figure 6:
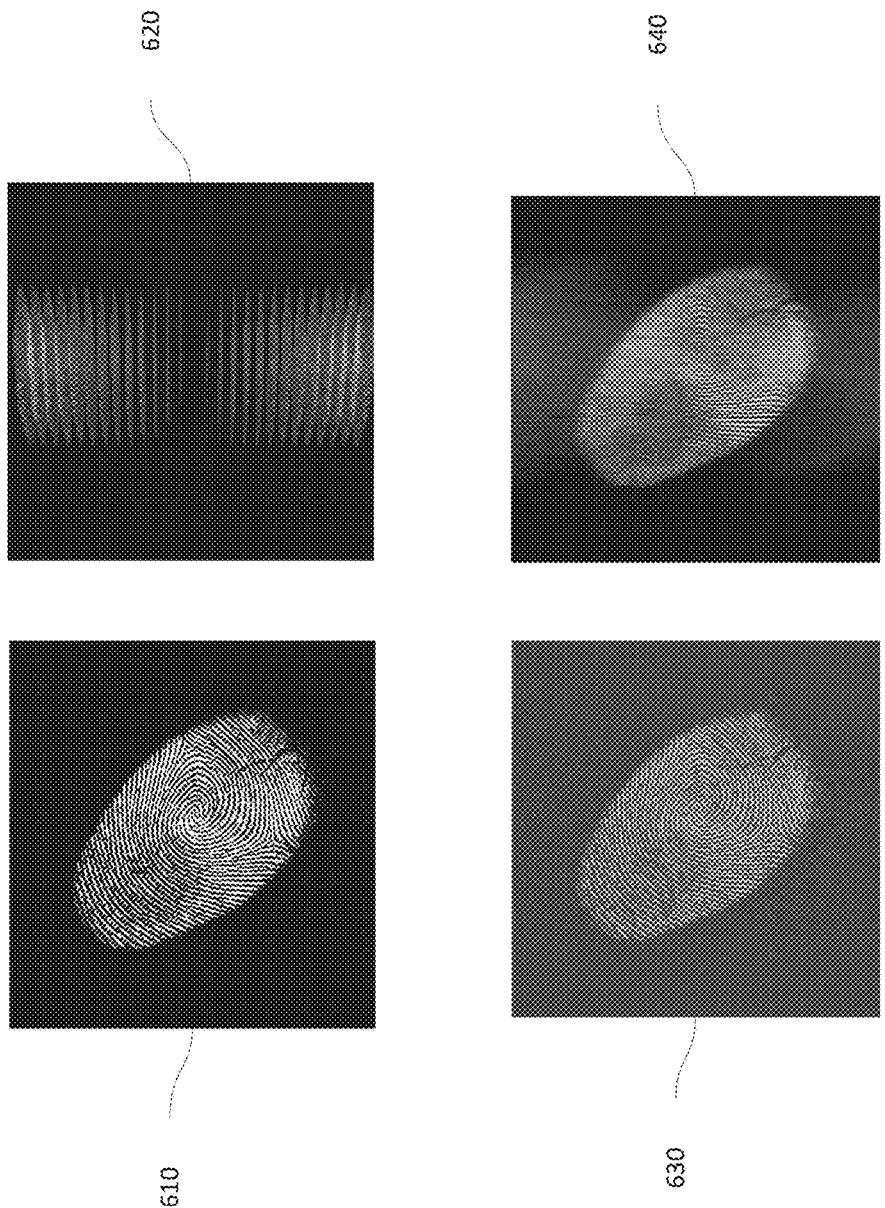
FIG. 6 shows example images of fingertips and reconstructed images of fingertips according to this disclosure.

Referring now to FIG. 6, FIG. 6 shows an example of a fingerprint 610 as it would appear to a camera positioned directly beneath the fingertip in contact with the cover glass 110. Image 620 represents the image captured by the camera 230 of the fingerprint 610. Image 630 represents a reconstruction of the fingerprint 610 using the least-squares technique, and image 640 represents a reconstruction of the fingerprint 610 using the back-projection technique. As can be seen, each technique generates an image 630, 640 of a reconstructed fingerprint that approximates the user's fingerprint 610.

Figure 7:
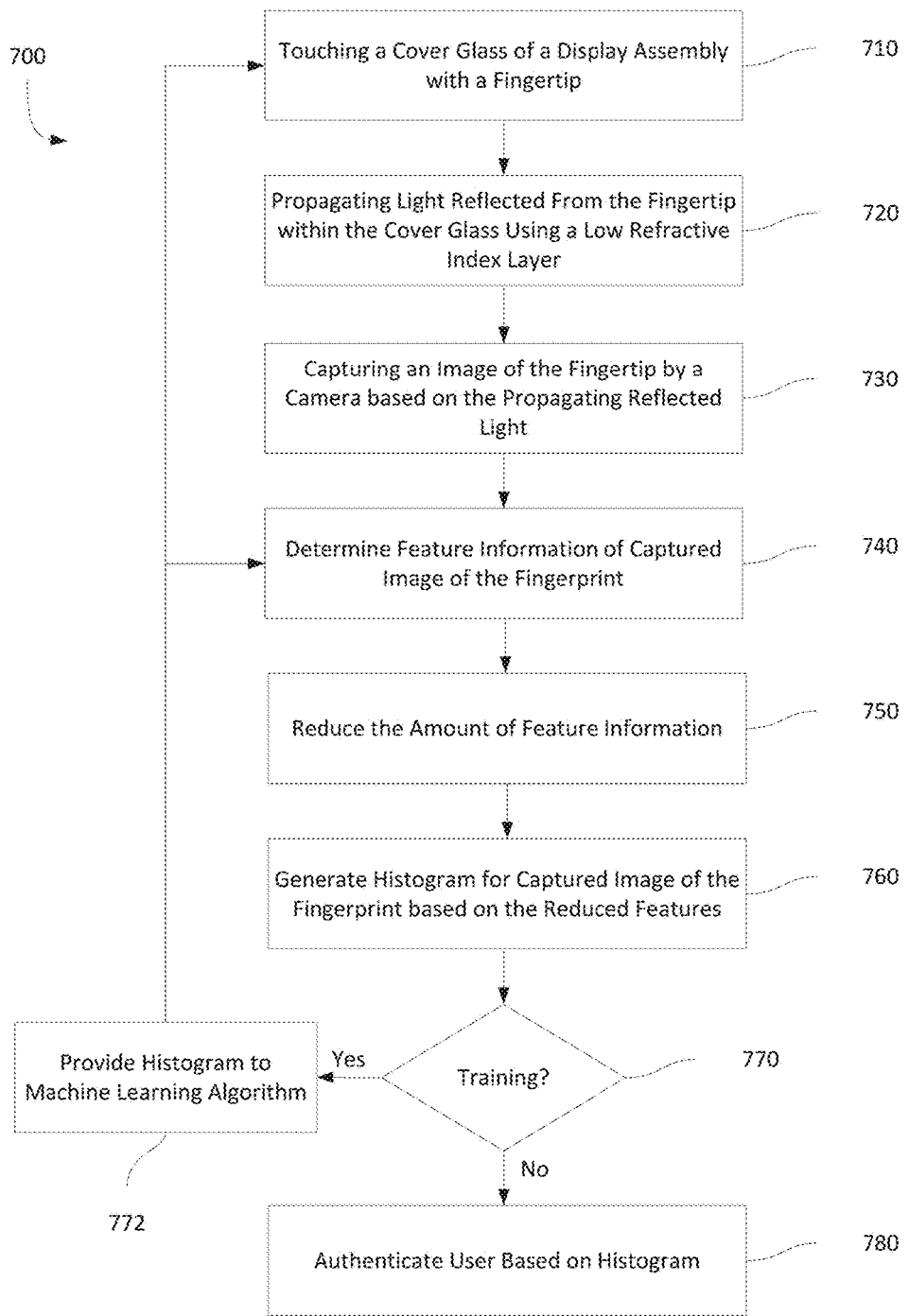

Referring now to FIG. 7, FIG. 7 shows an example method 700 of authenticating a user using an example display assembly 200 according to this disclosure. The method 700 of FIG. 7 will be discussed with respect to the computing device 800 shown in FIG. 8; however, it should be appreciated that other example computing devices according to this disclosure may be used to perform this and other example methods.

The method 700 of FIG. 7 may be used in different ways. In this example, the method may be used to train a machine learning algorithm to recognize one or more users' fingerprints, or it may be used to authenticate a user's fingerprint based on a previously-trained machine learning algorithm. As may be seen in FIG. 7, subsequent to completion of functionality at block 760, the method 700 may return to an earlier step to analyze, and in some examples also capture, an additional image, e.g., if the machine learning algorithm is being trained, or it may proceed to block 770 if it is being used to authenticate a user using a previously-trained machine learning algorithm. The method 700 of FIG. 7 begins at block 710.

At block 710, a user touches the cover glass 110 of a display assembly 200 with one or more fingertips. For example, the user may touch the cover glass 110 of a display assembly 200 of the computing device 800, e.g., her smartphone.

At block 720, light reflects from the user's fingertip back into the cover glass 110 and propagates within the cover glass 110 by reflecting from inner surfaces of the cover glass 110 using the LRI layer 215, which allows a greater amount of reflected light rays to propagate within the cover glass 110.

At block 730, the camera 230 captures an image of the user's fingertip based on light propagating through the cover glass 110 into the prism structure 220 and onto the camera's sensor. As mentioned above, the captured image of the fingertip can include two or more fingertip images. It is understood that, subsequent to block 730, computing device 800 will receive the image of the fingerprint captured by the camera 230. Furthermore, it is understood that method 700 includes blocks 710 and 720 for completeness, and that blocks 710 and 720 are not performed by the camera 230 or by computing device 800 in communication with the camera 230.

At block 740, the computing device 800 determines features of the fingerprint from the captured image. In this example, the computing device 800 does not first reconstruct the fingertip from the captured image, but instead operates on the captured image itself. To determine the features, the computing device 800 employs an interest point detection or descriptor technique on the captured image, such as one or more of a Speeded Up Robust Features (SURF) technique, a Dense SURF technique, a Min Eigen technique, a Maximally Stable Extremal Region (MSER) technique, a Features from Accelerated Segment Test (FAST) technique, a Binary Robust Invariant Scalable Keypoints (BRISK) technique, a Harris Affine Region Detector technique, or a Scale-Invariant Feature Transform (SIFT) technique. The output of the interest point detection technique comprises feature point information, which in some examples may comprise a descriptor vector. In some examples, suitable descriptors may include a SURF descriptor, a Fast Retina Keypoint (FREAK) descriptor, a Block descriptor, or a BRISK descriptor.

In this example, the computing device 800 employs a 16×16 local window to identify features, such as corners or edges within the captured image. For example, the computing device 800 may iterate the center of the local window through each pixel of the image, and for each center pixel, it may compare each pixel to the center pixel, e.g., based on the intensities of the pixels, and assign a '1' to the pixel in the local window if the pixel has a greater intensity than the center pixel, or a '0' if the center pixel has a greater intensity. Using such information or the techniques described above, the computing device 800 in this example may detect edges, corners, or other features within the image. Over multiple iterations, the computing device 800 can obtain edges, corners, or other features from multiple images and cluster them based on similar patterns.

At block 750, the computing device 800 reduces the amount of feature information. In this example, the computing device 800 reduces the amount of feature information through a quantization of the feature information using a vector quantization technique, such as a k-means clustering technique. In this example, the computing device 800 reduces the amount of feature information using k-means clustering to approximately 500 clusters, though in other examples, a different number of clusters may be employed.

At block 760, the computing device 800 generates a histogram for the captured image based on the reduced amount of feature information. For example, the computing device 800 may generate a histogram using each cluster as one bin within the histogram. The histogram may provide distribution information that may be used to match against previously-determined histograms to identify a likely match. Alternatively, the histogram may be provided to a machine learning algorithm along with a label, such as a user name, to identify the histogram to train the machine learning algorithm when enrolling a new user, for example.

At block 770, if the computing device 800 is training a machine learning algorithm, the method proceeds to block 772, otherwise, the method 700 proceeds to block 780.

At block 772, the computing device 800 provides the histogram to the machine learning algorithm. In this example, the computing device 800 employs a Random Forest machine learning classifier. Thus, when the computing device 800 is training the Random Forest classifier, it provides generated histograms and associated labels (such as, for example, a user name of a new user wishing to enroll) to the classifier. Other suitable machine learning algorithms include a Support Vector Machine (SVM) technique, or other supervised machine learning techniques. Subsequent to providing the histogram to the classifier and executing the classifier using the histogram, the method returns to block 710 if a new image of a fingertip is to be captured, or it may return to block 740 if further training images have already been captured. Otherwise, the method 700 may terminate if no further training images are to be captured or are available At block 780, the computing device 800 authenticates the user based on the generated histogram. As discussed above with respect to block 770, the computing device 800 in this example employs a Random Forest classifier. Thus, the computing device 800 provides the generated histogram to the Random Forest classifier, which determines whether the histogram is associated with any known users based on prior training of the classifier. Should the classifier identify a sufficiently strong match with a known user based on the provided histogram, the classifier outputs an indication of the identified user, such as, for example, a label, otherwise the classifier outputs an indication that the provided histogram does not match a known user. If the classifier outputs a known user, the computing device 800 may then authenticate the user, otherwise, the computing device 800 may deny authentication of the user or may ask for the user to re-attempt authentication, such as by touching the cover glass 110 again, or the computing device 800 may simply capture an additional image of the user's fingertip and re-perform method 700.

In some examples, the computing device 800 may, as a matter of course, only authenticate a user after multiple successful positive results from executing one of the example methods according to disclosure, such as the methods 500, 700 of FIG. 4 or 6. For example, the computing device 800 may capture the user's fingertip on two or more successive occasions and only authenticate the user if all three occasions result in a positive match for the same user, or a majority of the occasions result in a positive match. By requiring continued authentication, the computing device 800 may provide more secure access to one or more of the computing devices 800 functions, or to the computing device 800 itself. For example, while using a secure application or accessing secure data, the computing device 800 may attempt to authenticate the user each time the computing device 800 detects a contact with the cover glass 110, and may deny authentication if the authenticated user changes or if a sufficient number of authentication failures occurs over a period of time or a number of detected contacts with the cover glass 110.

Further, in some examples, the camera 230 may be configured to capture additional information such as spectral information to identify biological processes, such as heartbeats or pulse oxidation to detect whether the object contacting the cover glass 110 is truly a user's finger or is a forged fingerprint, such as a fingerprint on a sheet of paper or a simulated hand.

Figure 8:
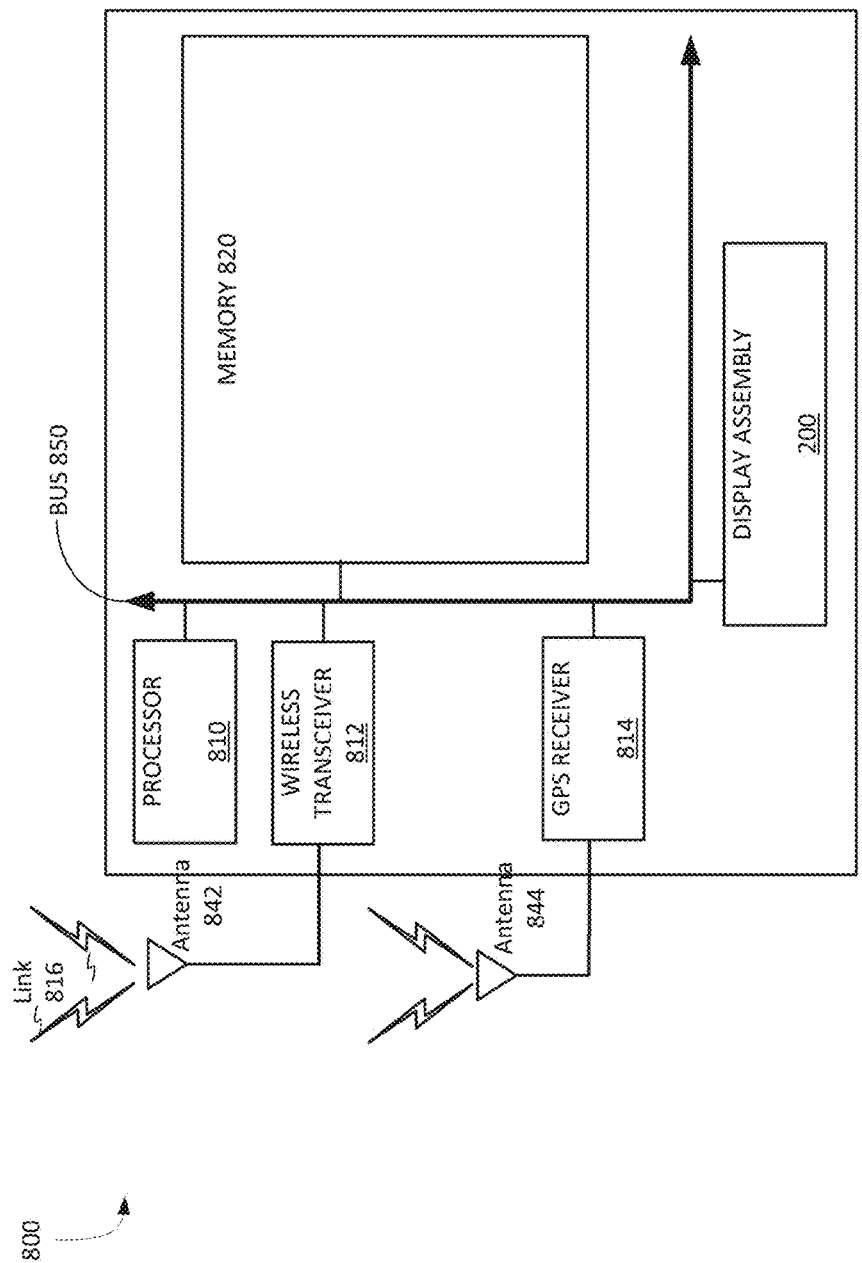
FIGS. 8-9 show example computing devices suitable for use with one or more example display assemblies for on-screen optical fingerprint capture for user authentication according to the present disclosure.

Referring now to FIG. 8, FIG. 8 shows an example of a computing device 800 suitable for use with one or more example display assemblies for cover-glass optical isolation for optical touch and fingerprint sensing according to the present disclosure.

FIG. 8 shows an example mobile wireless device 800. In the example shown in FIG. 8, the mobile device 800 includes a processor 810, a memory 820, a wireless transceiver 812, a Global Navigation Satellite System ("GNSS") receiver (e.g., a Global Positioning System ("GPS") receiver) 814, a display assembly 200, and a bus 850. In this example, the mobile device comprises a cellular smartphone, but may be any suitable device, include a cellular phone, a laptop computer, a tablet, a phablet, a personal digital assistant (PDA), wearable device, or augmented reality device. The processor 810 is configured to employ bus 850 to execute program code stored in memory 820, to output display signals to the display assembly 200, and to receive input signals from the display assembly 200. In this example, the display assembly 200 comprises the example display assembly 200 shown in FIG. 2. However, any suitable display assembly according to this disclosure may be employed in different example mobile wireless devices, such as wireless device 800.

In addition, the processor 810 is configured to receive information from the GPS receiver 814 and wireless transceiver 812 and to transmit information to the wireless transceiver 812. The wireless transceiver 812 is configured to transmit and receive wireless signals via antenna 842 using link 816. For example, the wireless transceiver may be configured to communicate with a cellular base station by transmitting signals to and receiving signals from an antenna associated with the cellular base station. The GPS receiver 814 is configured to receive signals from one or more GPS satellites and to provide location signals to the processor 810.

Figure 9:
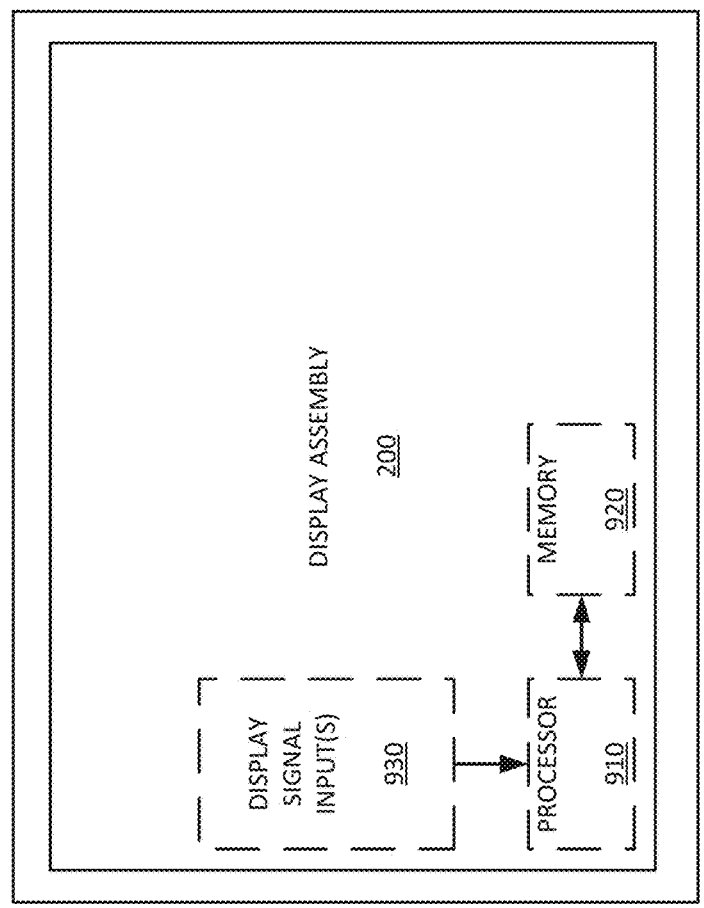

Referring now to FIG. 9, FIG. 9 an example of a computing system suitable for use with one or more example display assemblies for cover-glass optical isolation for optical touch and fingerprint sensing according to the present disclosure.

FIG. 9 shows an example television 900. In this example, the television 900 comprises a display assembly 200, a processor 910, a memory 920, and one or more display signal inputs 930. In this example, the display assembly 200 comprises the example display assembly 200 shown in FIG. 2. However, any suitable display assembly according to this disclosure may be employed in different example computing devices, such as television 900, other televisions, or computer monitors. The display signal input(s) 930 comprise one or more inputs for receiving display signals, and in different examples may include one or more of an HDMI input, a DVI input, a DisplayPort input, a component video or audio input(s), a composite video or audio input(s), a coaxial input, or a network interface, such as Ethernet, Wi-Fi, Bluetooth, USB, cellular, etc.

Figure 10:
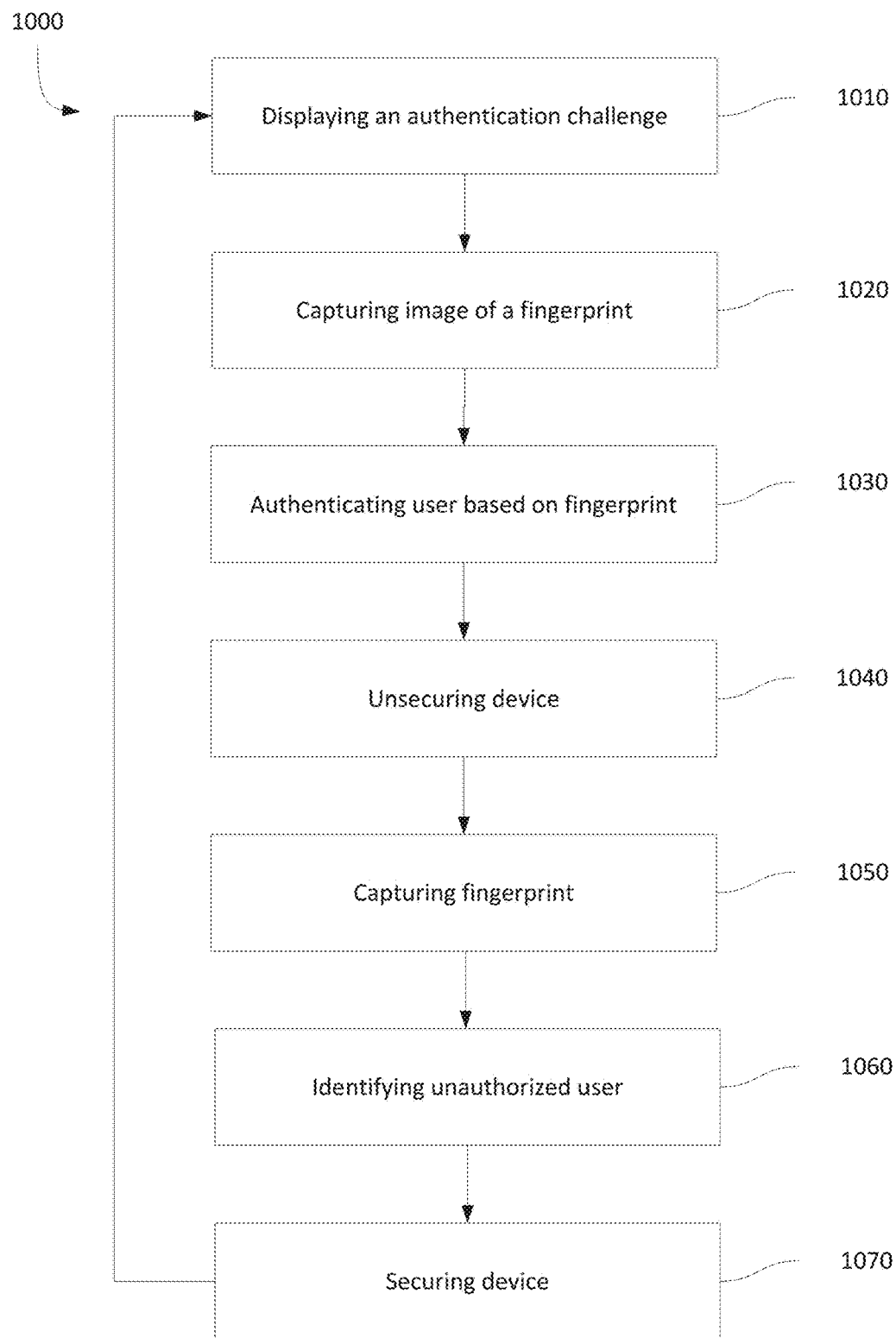

Referring now to FIG. 10, FIG. 10 shows an example method 1000 of authenticating a user using an example display assembly 200 according to this disclosure. The method 1000 of FIG. 10 will be discussed with respect to the computing device 800 shown in FIG. 8; however, it should be appreciated that other example computing devices according to this disclosure may be used to perform this and other example methods.

At block 1010, the computing device 800 displays an authentication challenge. In this example, the authentication challenge requests the user to provide authentication information to the computing device 800, such as a username and password or a fingerprint.

At block 1020, the computing device 800 captures an image of a fingerprint generally as discussed above with respect to blocks 510 to 530 of the method 500 shown in FIG. 5.

At block 1030, the computing device 800 authenticates the user based on the image of the fingerprint generally as discussed above with respect to block 540 of the method 500 shown in FIG. 5 or block 780 of the method 700 shown in FIG. 7.

At block 1040, the computing device 800 unsecures itself and allows the user to access information stored on or provided by the computing device. For example, the computing device 800 may display a desktop or home screen of a graphical user interface, or may display visual content, such as a document or image. The computing device 800 may also unsecure itself by enabling access to information by decrypting the information stored on the computing device 800.

At block 1050, while the computing device 800 is unsecured, it captures a second fingerprint generally as discussed above at block 1020, but at a time subsequent to and after the image captured in block 1020.

At block 1060, the computing device 800 determines a user associated with the fingerprint, or determines that no recognized user is associated with the fingerprint, and determines the user is not authorized to access the computing device 800 or is not authorized to view information displayed by the computing device 800.

At block 1070, in response to detecting the unauthorized user, the computing device 800 secures itself. For example, the computing device 800 may discontinue display of information previously displayed, or it may administratively lock the computing device 800, e.g., an operating system of the computing device may lock itself, or an application may lock content open within the application. The method 1000 may then return to block 1010, where the computing device 800 again displays an authentication challenge.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:
receiving an image of a fingerprint captured by a camera, the image of the fingerprint being based on light reflected from a fingertip and propagated within a glass layer of a display assembly;
determining feature information from the captured image of the fingerprint;
reducing the amount of feature information through a quantization of the feature information;

generating a histogram associated with the captured image based on the reduced amount of feature information; and authenticating a user based on the histogram.

2. The method of claim 1, wherein authenticating the user comprises providing the histogram to a machine learning algorithm and, responsive to providing the histogram to the machine learning algorithm, receiving a label from the machine learning algorithm.

3. The method of claim 2, wherein the label comprises one of a user name or an indication that the histogram was not recognized.

4. The method of claim 2, wherein the machine learning algorithm comprises one of a Random Forest classifier or a Support Vector Machine.

5. The method of claim 2, further comprising training the machine learning algorithm, wherein training the machine learning algorithm comprises providing the histogram and a label associated with the histogram to the machine learning algorithm.

6. The method of claim 1, wherein the captured image of the fingertip includes two or more fingertip images, each fingertip image having a different perspective of the fingertip.

7. The method of claim 1, further comprising:
receiving an image of a second fingerprint based on second propagating reflected light from a second fingertip, the receiving the image of the second fingerprint occurring at a time later than the receiving the captured image of the fingertip;
determining second feature information from the captured image of the second fingerprint;
reducing the amount of second feature information through a quantization of the second feature information;
generating a second histogram associated with the captured image of the second fingerprint based on the reduced amount of second feature information;
recognizing a user based on the second histogram or identifying no recognized user based on the second histogram; and
in response to recognizing an unauthorized user or not recognizing the second fingerprint, securing a computing device.

8. A computing device comprising:
a non-transitory computer-readable medium;
a processor in communication with the non-transitory computer-readable medium; and
a display assembly in communication with the processor, the display assembly comprising a glass layer; and
a camera comprising an image sensor, the image sensor oriented to receive light propagated within the glass layer of the display assembly; and
wherein the processor is configured to:
receive an image of a fingerprint from the camera, the image based on the propagated light within the glass layer;
determine feature information from the captured image of the fingerprint;
reduce the amount of feature information through a quantization of the feature information;
generate a histogram associated with the captured image based on the reduced amount of feature information; and
authenticate a user based on the histogram.

9. The computing device of claim 8, wherein the processor is further configured to provide the histogram to a machine learning algorithm and, responsive to providing the histogram to the machine learning algorithm, receive a label from the machine learning algorithm to authenticate the user.

10. The computing device of claim 9, wherein the label comprises one of a user name or an indication that the histogram was not recognized.

11. The computing device of claim 9, wherein the machine learning algorithm comprises one of a Random Forest classifier or a Support Vector Machine.

12. The computing device of claim 9, wherein the processor is further configured to provide histograms and labels associated with the histograms to the machine learning algorithm to train the machine learning algorithm.

13. The computing device of claim 8, wherein the captured image of the fingertip includes two or more fingertip images, each fingertip image having a different perspective of the fingertip.

14. The computing device of claim 8, wherein the processor is further configured to:
receive an image of a second fingerprint based on second propagating reflected light from a second fingertip, the image of the second fingerprint received after the image of the fingerprint;
determine second feature information from the captured image of the second fingerprint;
reduce the amount of second feature information through a quantization of the second feature information;
generate a second histogram associated with the captured image of the second fingerprint based on the reduced amount of second feature information;
recognize a user based on the second histogram or identify no recognized user based on the second histogram; and
in response to recognizing an unauthorized user or not recognizing the second fingerprint, secure the computing device.

15. An apparatus comprising:
means for propagating light within a display assembly;
means for capturing an image based on light received from the means for propagating light within a display assembly;
means for directing the propagating light onto the means for capturing an image;
means for determining feature information from the captured image of a fingerprint;
means for reducing the amount of feature information through a quantization of the feature information;
means for generating a histogram associated with the captured image based on the reduced amount of feature information; and
means for authenticating a user based on the histogram.

16. The apparatus of claim 15, wherein the means for authenticating the user comprises means for providing a label.

17. The apparatus of claim 16, wherein the label comprises one of a user name or an indication that the histogram was not recognized.

18. The apparatus of claim 16, wherein the means for authenticating comprises one of a Random Forest classifier or a Support Vector Machine.

19. The apparatus of claim 16, further comprising means for training the means for authenticating based on histograms and labels associated with the histograms.

20. The apparatus of claim 15, further comprising means for touch input coupled to the means for propagating light.

21. The apparatus of claim 15, further comprising means for securing a computing device in response to not authenticating the user.

22. The apparatus of claim 15, wherein the captured image includes two or more fingertip images, each fingertip image having a different perspective of the fingertip.

23. The apparatus of claim 15, further comprising:
means for receiving an image of a second fingerprint based on second propagating reflected light from a second fingertip, the receiving the image of the second fingerprint occurring at a time later than the receiving the captured image of the fingertip;
means for determining second feature information from the captured image of the second fingerprint;
means for reducing the amount of second feature information through a quantization of the second feature information;
means for generating a second histogram associated with the captured image of the second fingerprint based on the reduced amount of second feature information;
means for recognizing a user based on the second histogram or identifying no recognized user based on the second histogram; and
means for, in response to recognizing an unauthorized user or not recognizing the second fingerprint, securing a computing device.

24. A non-transitory computer-readable medium comprising processor-executable instructions configured to cause a processor to:
receive an image of a fingerprint based on light reflected from a fingertip;
determine feature information from the captured image of the fingerprint;
reduce the amount of feature information through a quantization of the feature information;
generate a histogram associated with the captured image based on the reduced amount of feature information; and
authenticate a user based on the histogram.

25. The non-transitory computer-readable medium of claim 24, wherein the processor-executable instructions are further configured to provide the histogram to a machine learning algorithm and, responsive to providing the histogram to the machine learning algorithm, receive a label from the machine learning algorithm to authenticate the user.

26. The non-transitory computer-readable medium of claim 25, wherein the label comprises one of a user name or an indication that the histogram was not recognized.

27. The non-transitory computer-readable medium of claim 25, wherein the machine learning algorithm comprises one of a Random Forest classifier or a Support Vector Machine.

28. The non-transitory computer-readable medium of claim 25, wherein the processor-executable instructions are further configured to provide the histogram and a first label associated with the histogram to the machine learning algorithm and to train the machine learning algorithm based on the histogram and the label.

29. The non-transitory computer-readable medium of claim 24, wherein the captured image of the fingertip includes two or more fingertip images, each fingertip image having a different perspective of the fingertip.

30. The non-transitory computer-readable medium of claim 24, wherein the processor-executable instructions are further configured to:
receive an image of a second fingerprint based on second propagating reflected light, the image of the second fingerprint received after the image of the fingertip;
determine second feature information from the captured image of the second fingerprint;
reduce the amount of second feature information through a quantization of the second feature information;
generate a second histogram associated with the captured image of the second fingerprint based on the reduced amount of second feature information;
recognize a user based on the second histogram or identifying no recognized user based on the second histogram; and
in response to not recognizing a user based on the second histogram or identifying no recognized user based on the second histogram, secure a computing device.

* * * * *